United States Patent [19]

Steilen

[11] Patent Number: 4,590,869
[45] Date of Patent: * May 27, 1986

[54] DOUBLE DISK OPENER ASSEMBLY AND DISK BLADE THEREFOR

[75] Inventor: Ronald M. Steilen, Ankeny, Iowa

[73] Assignee: Deere & Company, Moline, Ill.

[*] Notice: The portion of the term of this patent subsequent to Apr. 8, 1997 has been disclaimed.

[21] Appl. No.: 203,184

[22] Filed: Nov. 3, 1980

Related U.S. Application Data

[63] Continuation of Ser. No. 011,534, Feb. 12, 1979, abandoned.

[51] Int. Cl.$^4$ .................. A01B 71/04; A01B 15/16; A01C 5/06
[52] U.S. Cl. .................................. 111/88; 172/575; 172/604
[58] Field of Search ............. 172/575, 604, 560, 574; 308/19, 181; 111/88

[56] References Cited

U.S. PATENT DOCUMENTS

| | | | |
|---|---|---|---|
| 646,506 | 4/1900 | Sester | 172/575 |
| 734,016 | 7/1903 | Van Brunt | 172/575 |
| 783,395 | 2/1905 | Ashurst | 111/88 |
| 1,008,068 | 11/1911 | Robinson | 308/19 |
| 1,077,338 | 11/1913 | Elliot et al. | 172/575 |
| 1,095,798 | 5/1914 | Brennan, Jr. | 172/575 |
| 1,663,239 | 3/1928 | Bucknam | 172/604 |
| 2,005,547 | 6/1935 | Johnson | 308/181 X |
| 2,092,589 | 9/1937 | Scarlett | 172/575 X |
| 2,105,120 | 1/1938 | Johnson | 308/181 |
| 2,540,661 | 2/1951 | Evans et al. | 308/181 |
| 2,556,492 | 6/1951 | Dockery et al. | 308/19 X |
| 3,397,933 | 8/1968 | Hatcher | 308/181 |
| 4,136,746 | 1/1979 | Tusing | 308/19 X |
| 4,196,779 | 4/1980 | Steilen | 172/604 |

Primary Examiner—Paul E. Shapiro

[57] ABSTRACT

An improved double disk blade opener assembly and disk blade therefor are provided for a grain drill or the like. A pair of bearings are supported on opposite sides of a seed boot casting or arm structure mounted on the implement. Each bearing supports a threaded shaft which extends outwardly therefrom to a blade-receiving end. A pair of generally flat disk blades each fabricated from a single piece of sheet metal and having opposed outwardly cupped central portions to accommodate the bearings are secured on and rotate with the shafts. Mounting the bearings in the boot rather than in bearing caps on the blade decreases the overall width of the opener and increases trash flow between adjacent openers. Socket screws which previously were used to secure the blade assembly to the boot, which required tapping of the boot and which frequently worked loose therefrom are eliminated. The specially shaped disk blades retain the desired furrow cutting characteristics of conventional flat disk blades.

1 Claim, 4 Drawing Figures

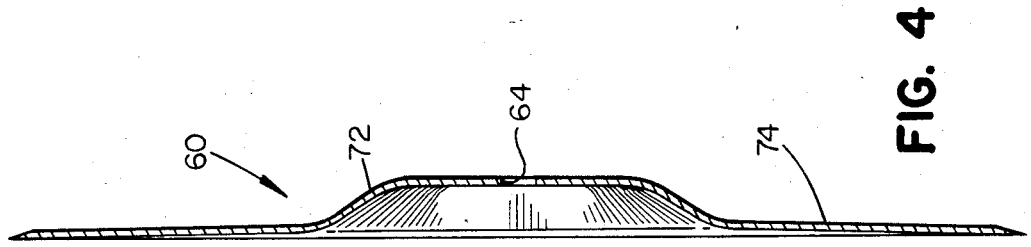
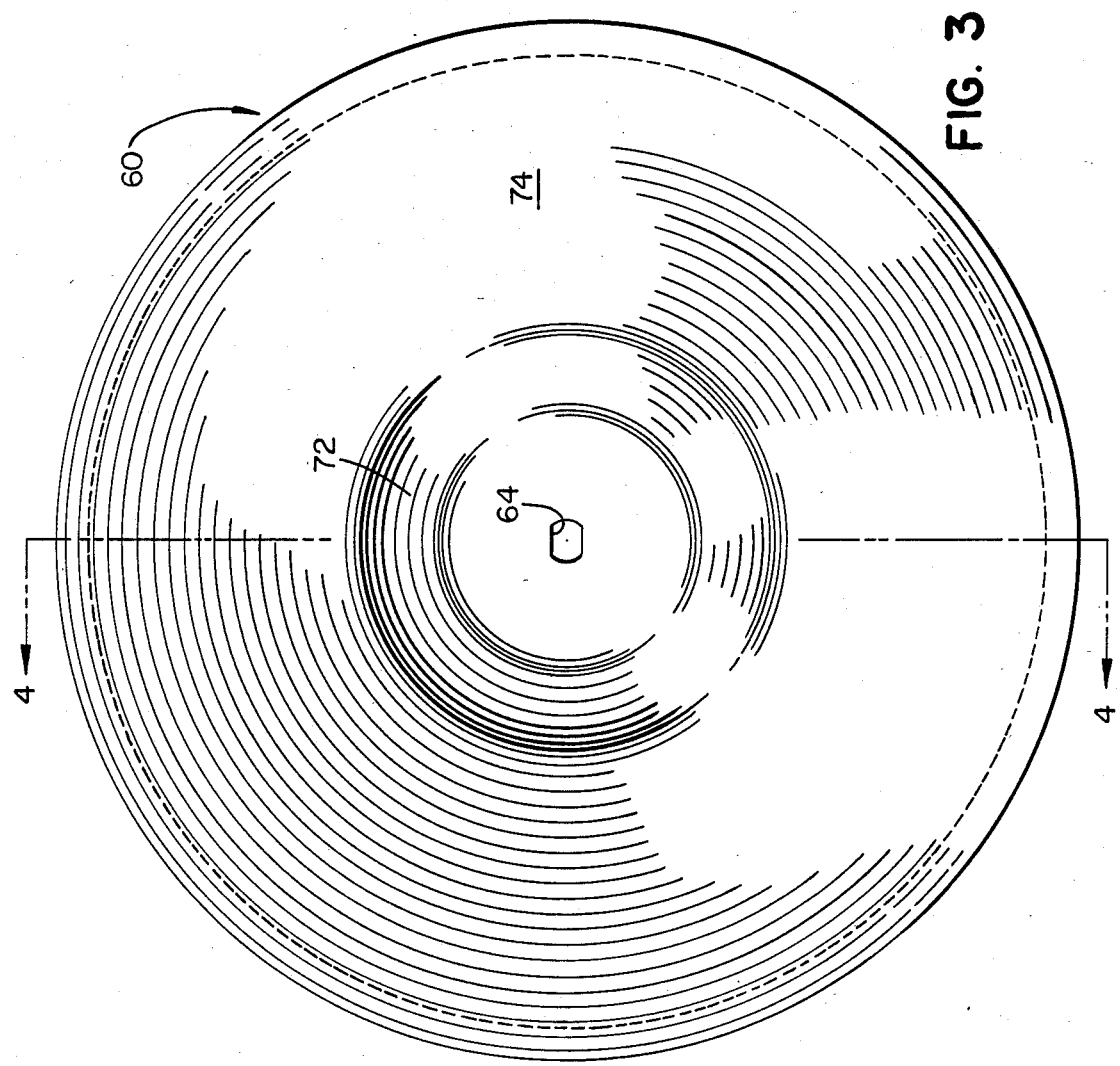

DOUBLE DISK OPENER ASSEMBLY AND DISK BLADE THEREFOR

CROSS REFERENCE TO RELATED APPLICATION

This is a continuation of U.S. application Ser. No. 011,534 filed Feb. 12, 1979, now abandoned.

BACKGROUND OF THE INVENTION

This invention relates generally to furrow openers for grain drills or the like, and more specifically to an improved double disk furrow opener and disk blades therefor.

Double disk openers are used extensively to provide a furrow for receiving seed grains and/or fertilizer. FIG. 1 of the drawings shows a double disk opener assembly 10 typical of previous devices and used for example with the John Deere Series 8000 and 9000 Grain Drills. A pair of flat disk blades 12 are mounted for rotation on bearing screws 14 secured in tapped holes provided in a machined face of a cast seed boot 16. Each screw 14 extends through an inner race of a bearing 18 mounted within a bearing cap 20 which in turn is secured to the blade 12 by a plurality of rivets 22. The flat blades 12 form a narrow V-shaped cutting point 23 for establishing a furrow. Using flat blades 12 allows the point 23 to remain narrow so that the force necessary for the blades to penetrate the ground is minimized and so that the amount of dirt thrown away from the furrow is minimized.

To remove a blade from or secure a blade to the boot 16, a bearing plug 24 on the end of the cap 20 is removed and a hexagon or alan wrench is inserted into a hex recess in the head 28 for turning the bearing screw 14. Two wrenches are necessary to remove the two screws 24 and 14 each time a blade 12 is to be replaced. Additionally, the seed boot 16 has to be tapped to receive the screws 14 thereby increasing the cost of the assembly 10.

Preventing the bearing screw 14 from coming out of the boot 16 has been a continuing problem requiring that the screw be tightened by impact. The tapped hole often has threads that are inferior to those, for example, in a nut, and therefore the bearing screw cannot be tightened comparably to a nut and bolt assembly. Additionally, torquing the bearing screw with an alan wrench is more difficult than torquing a nut and bolt assembly with a socket or box-end wrench or the like. Loss of complete disk blade members commonly occurs as the screws 14 work loose because of vibration during transport or operation of the implement.

When a blade member such as that shown in FIG. 1 is replaced, the bearing 18 is normally replaced at the same time whether or not it is worn or otherwise damaged because it is secured to the blade 12 by the riveted bearing cap 20. Although bolts could be used to replace the rivets 22, they would have a tendency to work loose and would require additional time for removal when retrieving a bearing 18. Each cap 20 protrudes outwardly from the axis of rotation of the disk blade widening the assembly 10 and thereby decreasing the distance between adjacent assemblies which hampers the free flow of trash. When the assemblies 10 are spaced for narrow row planting, the obstruction of trash flow by the caps 20 is particularly significant since row spacing may be on the order of only about 6 inches. Small reductions in the width of the assemblies can reduce trash flow problems. Often adjacent rows will be staggered front-to-back to increase the spacing. If staggering is used it is important that the openers cut a clean furrow without the rear openers throwing dirt on the furrow cut by the forward openers.

As is evident from FIG. 1, each blade member is fabricated from several components rather than a single piece of metal. The bearing cap 20 is difficult to fabricate and requires the additional step of riveting to the blade 12. Since the blade itself is most likely to wear out and need replacement before other components such as the bearing 18 or the cap 20, a double disk assembly design is necessary which requires no replacement of other components if only the blade is worn or damaged. It is also desirable to eliminate the bearing cap and reduce the width of the assembly so that the trash flow characteristics of the blade assemblies are improved.

In my copending application Ser. No. 908,741, now U.S. Pat. No. 4,196,779 filed May 23, 1978 and assigned to the assignee of the present application, a mounting for a single disk opener is described in which the riveted bearing cap is eliminated by mounting the bearing on a support on the implement rather than on the blade. The blade which is generally disk-shaped is secured with a single nut on a shaft which depends outwardly from the bearing. It is desirable to provide a double disk blade assembly using two bearings mounted in a similar fashion on the cast boot so that the boot does not have to be tapped for receiving a bearing screw such as shown at 14 in FIG. 1. To provide the narrow, V-shaped point 23, it is necessary that each bearing support a generally flat rather than dish-shaped blade member. A disk blade is required which can accommodate the above-described bearing while maintaining the desired V-shaped point for good furrow forming characteristics.

BRIEF SUMMARY OF THE INVENTION

It is therefore an object of the present invention to provide an improved double disk blade opener assembly for a grain drill or the like.

It is a further object to provide a double disk blade opener assembly which eliminates the need for a tapped boot and for bearing screws tightened into the boot, and which decreases the incidence of lost blade members.

It is still a further object of the invention to provide such a double disk blade opener assembly having improved trash flow characteristics while at the same time retaining a narrow, V-shaped cutting point to maintain the soil penetrating and dirt flow characteristics common to presently utilized flat disk blade assemblies.

It is a further object of the invention to provide an opener assembly utilizing a pair of disk blades, each with a unitary structure which is generally flat and which has an outwardly cupped central portion. Each blade is mounted on a shaft which in turn is rotatably supported from a bearing carried by the seed boot or arm member.

It is another object of the present invention to provide a double disk blade opener assembly wherein the bearings for the assembly are carried by the seed boot or arm. Extending outwardly from each bearing is a transverse threaded shaft rotatably supporting a generally flat, one-piece disk blade with an outwardly cupped central portion. Each blade is secured between a single nut threaded on a shaft and the bearing. The cupped portion of each blade accommodates the bearing and the section of the seed boot around the bearing, while the generally flat outer portion of the blade provides a narrow, V-shaped cutting point having furrow forming characteristics generally identical to that of the previously used assemblies having flat disk blades.

These and other objects and advantages of the present invention will become evident from the description of the preferred embodiment and from the drawings.

BRIEF DESCRIPTION OF THE DRAWINGS

FIG. 3 is a side view of the disk blade of the present invention; and

FIG. 4 is a sectional view taken along lines 4—4 of the blade shown in FIG. 3.

DESCRIPTION OF THE PREFERRED EMBODIMENT

Figure 2:
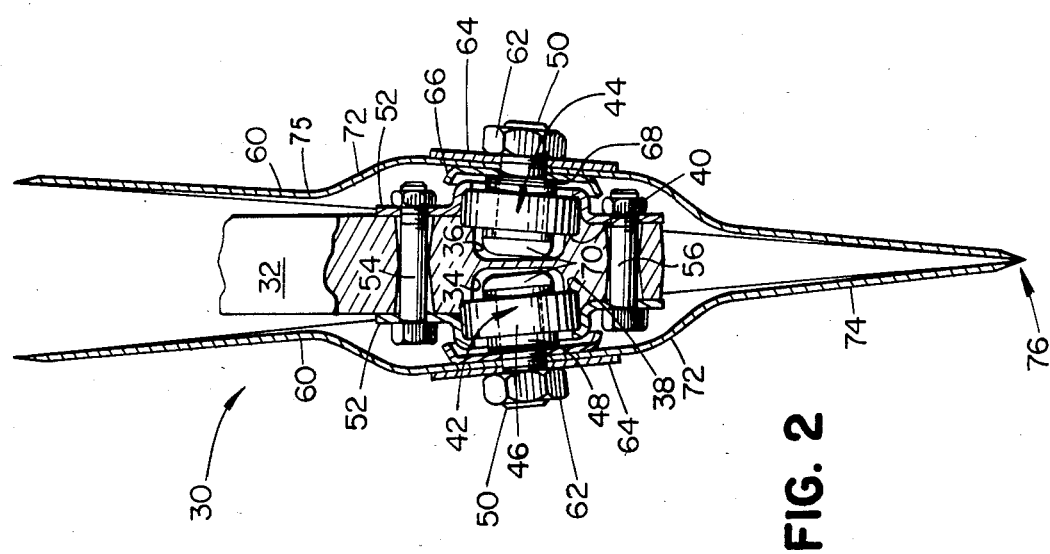
FIG. 2 is a plan view, partially in section to better show the arrangement of the bearings, of the double disk furrow opener of the present invention.

The double disk blade opener assembly of the present invention is shown generally at 30 in FIG. 2. A seed boot 32, preferably cast from aluminum, is secured in a conventional manner to a grain drill (not shown) or the like. The boot 32 is cast with outwardly facing openings 34 and 36. A pair of outwardly facing bearing receiving seats 38 and 40 are also formed in the seed boot 32. The openings and seats are cast so that no machining of the boot is necessary. Supported on the seats 38 and 40 are bearings 42 and 44, respectively. Each bearing includes an outer race 46 and an inner race 48 having a bolt 50 extending therethrough. A flangette or cap structure 52 tightened in position on the boot 32 by bolts 54 and 56 which pass through holes cast in the boot 32 holds the outer race 46 of each bearing against the corresponding bearing receiving seat. A more detailed description of the bearing arrangement can be found in the aforementioned U.S. Pat. No. 4,196,779. The holes are tapered slightly to facilitate parting of the casting dies. The plane of the seats 38 and 40 are angled slightly from the vertical so the outwardly facing face extends slightly downwardly. The shafts 50 which extend outwardly from the inner races 48 therefore are tilted downwardly.

Secured on the shafts 50 are a pair of disk blades 60. Each blade 60 is secured between the inner race 48 and a securing nut 62 threaded on the end of the shaft 50. The shafts 50 have opposed flats on their threaded ends which correspond to the shape of an oblong hole 64 through the center of the disk 60. A washer 64 is secured between the blade and the securing nut 62. A dust cap member 66 is mounted on the shaft 50 inwardly of the blade 60, and spacer washers 68 are provided on the shaft between the cap 66 and the inner race of the bearing. Each shaft 50 includes a headed end 70 abutted against the inside face of the inner bearing race 48. As is evident from FIG. 2, when the securing nut is tightened into position the blade 60, the shaft 50, the washers 64 and 68, the dust cap member 66, and the inner race 48 rotate in unison about the axis of the shaft 50. The oblong hole 64 which receives the flatted end of the shaft 50 prevents relative rotation of the shaft and the blade 60 and provides a means for preventing rotation of the shaft 50 as the securing nut 62 is tightened thereon.

Figure 1:
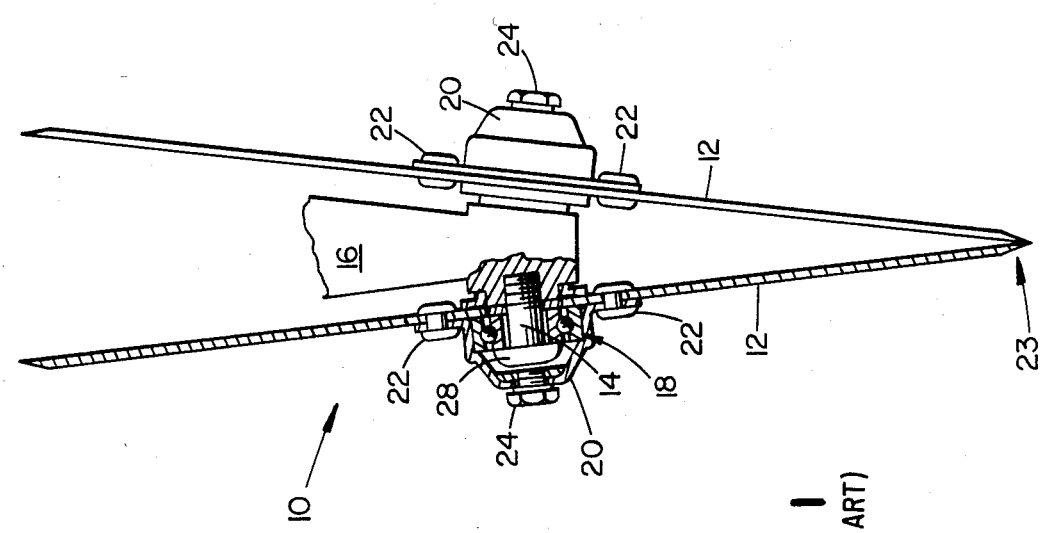
FIG. 1 is a plan view, partially in section, of a double disk furrow opener typical of the prior art.

The blade 60, which is preferably stamped out of a unitary piece of high carbon steel, includes an outwardly cupped or hub portion 72 near the center of the disk, and has a generally flat radially outward portion 74 joined by a fillet or round junction 75 to a hub portion. The hub portion 72 extends around the bearing 42, the dust cap 66, and the spacer washers 68. As best seen in FIG. 4, the radius of the hub portion 72 is less than half the radius of the blade 60. The flat radially outward portion 74 of the blade thereby is positioned substantially identically to the radially outward portion of the blade 12 shown in FIG. 1. A narrow, V-shaped cutting point 76 similar to the cutting point 23 of the blade in FIG. 1 is formed. The cupped central portion 72 of the blade 60 accommodates the bearing structure secured on the boot 32 while maintaining the cutting edge of the blade in a plane which intersects the bearing 42. No bearing cap such as that shown in 20 in FIG. 1 is necessary, and the blade can be fabricated from a single piece of metal. The overall width of the double disk blade assembly 30 is slightly less than the width of the assembly 10 shown in FIG. 1, while at the same time the narrow, V-shaped furrow cutting point is maintained.

The double disk opener arrangement constructed according to the invention is mounted on a grain drill or similar implement and is pulled through the soil so the V-shaped cutting point 76 forms a furrow therein. The spacer washers 68 maintain proper separation of the disk blades 60 so that they just barely touch at the tip of the cutting point. If a blade 60 becomes worn or damaged requiring adjustment or replacement, the corresponding jam nut 62 is removed from the threaded shaft 50 and a new blade is attached or one or more of the spacer washers 68 are removed so the disk blades touch at the tip. The narrower profile of the assembly 30 allows trash to flow more freely. The flat portions 74 of the blades 60 provide a narrow groove and allow each assembly 30 to penetrate the ground easily. Additionally, the narrow V-shaped cutting point prevents dirt from being thrown from one furrow into the furrow cut by an adjacent assembly 30.

A single wrench is the only tool that is necessary to remove a blade from or secure a blade on the shaft 50. The jam nut 62 on the shaft 50 holds the blade 60 in position and has less tendency to work loose than the bearing screw 14 shown in FIG. 1. The thread quality is generally better on the nut 62 and it can be tightened on the shaft 50 easier and more securely than the bearing screw can be tightened into the threaded hole. In the event a bearing 42 or 44 fails, it can be replaced easily by removing the bolts 54 and 56 and the flangette 52.

The cost of fabricating the cast boot 32 is reduced since it requires no machining or tapping. No moving part of the assembly is in frictional contact with the cast boot since the blades are supported from the shafts extending from the inner races of the bearings. The hub portion of each blade accommodates the bearing structure and positions the plane of the cutting edge so that it intersects the bearing.

I claim:

1. A double disk blade opener assembly comprising:
   a cast seed boot having opposed outwardly facing sidewalls, each including a stepped bore defining an annular shoulder recessed inwardly from the sidewalls;
   a pair of bearings, each having an inner race with a central aperture and an outer race concentric with the inner race, said outer race having axially inwardly and outwardly facing edges and said inner race including an outwardly facing surface axially outwardly of the outwardly facing edge, wherein the distance between the edges is greater than the distance between the sidewall and the shoulder;

a pair of clamp means, each releasably engaging the outwardly facing edge of the outer race of one of the bearings and non-rotatably positioning the inwardly facing edge against the shoulder with a major portion of the outer race extending outwardly beyond the sidewall;

a pair of shafts, each extending through one of the central apertures of the inner races for rotation therewith and including an axially extended end;

a pair of circular disk blades, each of unitary construction having a central circular cupped portion and a generally flat, radially outward portion forming a rounded junction with the cupped portion, said outward portion having an outer circumference defining a cutting edge, wherein the cupped portion has a central flattened area including a central shaft receiving aperture therein for receiving the axially extended end of one of the shafts therethrough with the cupped portion opening inwardly around the outwardly extending portion of the corresponding outer race; and means clamping each disk blade on the corresponding shaft between the outwardly facing surface of the inner race and the axially extended end of the shaft for rotation with the shaft and the inner race.

* * * * *